United States Patent [19]
Watanabe et al.

[11] Patent Number: 5,332,190
[45] Date of Patent: Jul. 26, 1994

[54] ELASTIC MOLDING DIE

[75] Inventors: Akinori Watanabe, Tokyo; Itaru Horiguchi, Ryugasaki; Tsuguyo Ando, Kasukabe; Atsushi Sato, Ryugasaki, all of Japan

[73] Assignee: Okamoto Industries, Inc., Tokyo, Japan

[21] Appl. No.: 900,264

[22] Filed: Jun. 18, 1992

[30] Foreign Application Priority Data

| Jun. 18, 1991 | [JP] | Japan | 3-171926 |
| Jun. 18, 1991 | [JP] | Japan | 3-171927 |
| Aug. 6, 1991 | [JP] | Japan | 3-219296 |
| Jan. 21, 1992 | [JP] | Japan | 4-008507 |

[51] Int. Cl.$^5$ .......... A23G 1/21; B28B 7/34; B29C 33/50
[52] U.S. Cl. .......... 249/115; 249/127; 249/134; 264/313; 264/314; 425/438; 425/440; 425/DIG. 14; 425/DIG. 44
[58] Field of Search ....... 425/100, 112, 134, DIG. 44, 425/453, 437, 440, 438, 39, 389, 390, 51, 52, 405.2, DIG. 14, DIG. 112; 264/313, 314; 249/134, 127, 65, 115

[56] References Cited

U.S. PATENT DOCUMENTS

| 3,427,689 | 2/1969 | Windecker | 249/134 |
| 3,539,144 | 11/1970 | Krug | 249/134 |
| 3,671,007 | 6/1972 | Bailey et al. | 249/134 |
| 5,154,937 | 10/1992 | Fujishima | 425/DIG. 44 |
| 5,207,965 | 5/1993 | Komine et al. | 425/437 |

FOREIGN PATENT DOCUMENTS

| 0220898 | 5/1987 | European Pat. Off. |
| 0429853 | 6/1991 | European Pat. Off. |

Primary Examiner—Jay H. Woo
Assistant Examiner—Joseph Leyson
Attorney, Agent, or Firm—Sherman and Shalloway

[57] ABSTRACT

An elastic molding die is composed of an elastomer laminate film, of which the innermost layer is formed of an elastomer not containing fillers. The innermost layer elastomer is preferably an oil-resistant elastomer. Alternatively, an oil-repellent agent may be contained in the innermost layer elastomer. The outer layer may be formed of an elastomer containing fillers. Furthermore, an oil blocking layer can be provided between the inner layer and the outer layer. A master model is dipped in an elastomer solution not containing fillers, heat dried to form a gelled elastomer film, the film is coated with a coagulant, dipped again in an elastomer solution, taken out, gelation treated, and the elastomer film is peeled from the master model to obtain an elastic molding die. In another method, a once-formed hollow elastic molding die is turned inside out, pressed in with a gas to swell, the swollen die is coated with an elastomer solution not containing fillers, heat dried, and turned it again inside out.

7 Claims, 1 Drawing Sheet

ELASTIC MOLDING DIE

FIELD OF THE INVENTION

This invention relates to an elastic molding die, more specifically, to an elastic molding die comprising a laminated film of an elastomer, and to a production method thereof.

DESCRIPTION OF PRIOR ART

There has heretofore been known a molding method using a molding die made of an elastic material such as natural rubber or chloroprene rubber, that is, an elastic molding die. In this molding method, a liquid molding material is charged into the elastic molding die through an opening of the die, heated or cooled to solidify the molding material, and then the solidified molding is taken out from the elastic molding die. To take out the molding, the elastic molding die is expanded using an air pressure difference or the like to peel the molding from the die, and discharged from the expanded opening. This elastic molding die can be repeatedly used.

This method provides a reduction in production cost of molding die, can produce moldings of a variety of desired designs since the method can eliminate the need for considering tapers or gradients for releasing, lends itself well to multi-item, small-lot production since it does not produce molding marks on the surface as seen in molding by split dies, and is thus used for molding chocalate, cheese, jelly, ice, boiled fish paste and the like.

However, molding using the elastic molding die tends to result in insufficient gloss of the moldings, which is particularly a problem in chocolate moldings which have deteriorated product values.

With a view to eliminate the above prior art defects of elastic molding dies, it is a primary object of the present invention to provide an elastic molding die which can produce moldings with good surface luster and has good durability that does not cause mold deformation even after repeated use. Another object of the present invention is to provide a production method of the elastic molding die.

SUMMARY OF THE INVENTION

The inventors have conducted intensive studies on the cause for reduced luster of the surface of moldings produced using elastic molding dies. As a result, it has been found that this problem is caused by fillers such as carbon black, clay and the like, which are mixed to improve the mechanical properties of the elastic molding dies and provide the dies with durability. Specifically, elastic molding dies of this kind have heretofore been produced from a latex based on an elastomer such as natural rubber, chloroprene rubber or the like, mixed with carbon black and clay as fillers to provide mechanical properties and durability as molding dies. However, it has been found that the presence of carbon black and clay has resulted in rough surfaces of the moldings and hindered the generation of surface luster. Then, the inventors have fabricated an elastic molding die from multilayered elastomer films, thereby achieving the present invention.

Thus, the present invention provides an elastic molding die comprising multilayered elastomer films, of which the innermost layer is made of an elastomer not containing fillers.

By constituting the innermost layer, that is, a portion contacting the molding material, with an elastomer not containing fillers, luster of the molding material can be considerably improved. To endow the die with mechanical properties and durability as an elastic molding die, it is preferable that the outer layer comprises an elastomer containing fillers such as carbon black, clay and the like. For example, the outer layer is fabricated from a latex based on natural rubber or chloroprene rubber, which is a material of conventional elastic molding dies, mixed with carbon black and clay. Of course, depending on the type of objective molding, other elastomers such as nitrile-butadiene rubber, acrylic rubber, urethane rubber, and fluorinated rubber can also be used as the elastomer. The ratio in thickness of the outer layer and the inner layer can be appropriately determined in consideration of the strength and elasticity required for the elastic molding die.

The innermost layer of the elastic molding die can be formed of natural rubber, chloroprene rubber, nitrile-butadiene rubber, acrylic rubber, urethane rubber, fluorinated rubber and the like. These rubbers are formed into a solution or dispersion and coated on the inner surface of the elastic molding die to form a film. Coating is achieved by spraying, brushing, dipping or the like. The elastomer may be previously formed adapting to the inner surface of the outer layer of the elastic molding die and bonded with an adhesive to the inner surface of the elastic molding die to form the innermost layer. It is preferable to use the molding method which will be described later.

Some molding materials to be molded with the elastic molding die contain oil ingredients, a typical example of which is chocolate. Heretofore, elastic molding dies for molding chocolate have been formed mainly of natural rubber and chloroprene rubber for their superior elasticity. However, natural rubber is very poor in oil resistance, and chloroprene rubber is insufficient in oil resistance. Therefore, the elastic molding die tends to be swollen with oil ingredients contained in chocolate during repeated use. As the die swells, the inner surface of the elastic molding die tends to become roughened, decreasing the surface luster of the molded products.

Therefore, when the innermost layer is formed of natural rubber or chloroprene rubber, and used for forming molding materials containing large amounts of oil ingredients such as chocolate, it is difficult to obtain moldings of good luster over an extended period of time, even if no fillers are used in the innermost layer. When molding materials containing oil ingredients are molded using an oil-resistant elastomer such as acrylic rubber, urethane rubber, fluorinated rubber or the like as an innermost elastomer, molding of good surface luster can be obtained over a long period of time, because these elastomers absorb less of the oil ingredients contained in the molding materials.

An elastic molding die formed of natural rubber or chloroprene rubber has been defective in that it tends to swell and deform due to oil ingredients in the molding material, and gradually increases in size, making it difficult to obtain products of uniform weight and dimensions using the same molding die for an extended time. However, as described above, when the innermost layer is formed of an oil-resistant elastomer, the innermost layer is not swollen with oil ingredients contained in the molding material, and the oil ingredients in the molding material are blocked by the innermost layer to prevent such ingredients from penetrating to the outer layer of the elastic molding die, thereby completely eliminating the above swelling problem.

The elastic molding die according to the present invention may be formed using a filler-free elastomer in the innermost layer, an oil blocking layer as the intermediate layer, and a filler-containing elastomer in the outer layer. The oil blocking layer can be formed of nitrile-butadiene rubber, acrylic rubber, urethane rubber, fluorinated rubber or the like. With this structure, oil ingredients, even when present, are prevented from penetrating to the outer layer resulting in swelling and deformation of the elastic molding die. Furthermore, the outer layer can be formed of a filler-containing elastomer to maintain the strength of the elastic molding die and improve the durability.

In the present invention, when the innermost layer elastomer is mixed with an oil repellent agent selected from the group consisting of silicone resins and fluororesins, moldings having improved luster can be produced over an extended period of time. Such an oil repellent agent can decrease the stickiness of the inner surface of the elastic molding die, improving the releasability of chocolate and minimizing the amount of chocolate remaining on the inner surface of the elastic molding die. This effect can be obtained independent of the oil resistance of the innermost layer elastomer. The silicone resins can be methylhydrogen-polysiloxane, dimethylpolysiloxane, dimethyl-methylphenyl-polysiloxane, and the like, and amino-modified, epoxy-modified, alcohol-modified compounds thereof. The fluororesins include polytetrafluoroethylene, polychlorotrifluoroethylene, polyvinylfluoride and the like. These additives are preferably added in amounts of 2 to 10 parts by weight to 100 parts by weight of the innermost layer elastomer.

A preferred method of producing an elastic molding die having the innermost layer not containing fillers will now be described.

Heretofore, when hollow products of relatively thick walls and uniform films, such as rubber gloves and elastic molding dies, are produced using an elastic molding die, a master model is first dipped in a rubber latex coagulant such as a nitrate solution, taken out, and dried to coat the coagulant on the surface. After that, the master model is dipped in a rubber latex to form a rubber film on the surface of the master model. However, moldings produced using an elastic molding die according to the prior art, for example, chocolate moldings, have a dull surface, and a good luster cannot be obtained even by adjusting the chocolate raw materials, often lowering the commercial value of the products. This defect often occurs even when an elastic molding die is used which has the innermost layer comprising a filler-free elastomer. The inventors have found that this is caused by the coagulant coated on the master model, which tends to roughen the innermost layer of the elastic molding die, and have eliminated the problem by the method described below.

In this method, the master model is first dipped in an elastomer solution not containing fillers, taken out, and heat dried to form a gelled elastomer film on the mold surface. The mold is then dipped in a coagulant solution, taken out, and heat dried to coat the coagulant on the surface of the gelled elastomer film. The result is again dipped in the elastomer solution, taken out, gelation treated, and then the elastomer film is peeled from the master model to obtain an elastic molding die.

In the method according to the present invention, the master model is made of glass, ceramics or the like. The surface of the master model is preferably as smooth as possible. Various elastomers can be used in the elastomer solution, but the elastomer solution applied in the first step does not contain fillers. The elastomer solution used afterward may be with or without fillers. The coagulant for the elastomer latex can be nitrate salts such as calcium nitrate.

In this method, the master model is first dipped in the elastomer solution not containing fillers, taken out, and heat dried. This forms a thin, gelled elastomer film on the surface of the master model. The inner surface of the thus formed elastomer film, that is, the surface in contact with master model, is very smooth. However, the film is very small in thickness. Thus, the film is inferior in mechanical properties, and thus cannot be used as an elastic molding die.

The master model having on its surface the gelled elastomer film is dipped in the elastomer coagulant solution, taken out, and dried to coat the film surface with the coagulant. The coagulant serves to coagulate the elastomer solution provided subsequently on the gelled elastomer film. The resulting model is again dipped in the elastomer solution, taken out, and gelation treated to prevent the elastomer solution from dripping. This can alternatively be achieved by heat drying, but it is preferable to dip into the coagulant solution in view of efficiency and appearance.

This treatment can form a sufficiently thick elastomer film that can be used as an elastic molding die. After that, the coagulant is washed out with water, the master model is dried, the elastomer film is peeled from the master model and vulcanized. Thus, the present invention provides an elastic molding die which has a very smooth inner surface, a sufficient thickness and superior mechanical properties.

Another preferred method of forming an elastic molding die, of which the innermost layer comprises an elastomer layer not containing fillers, will now be described.

In this method according to the present invention, a hollow elastic molding die is turned inside out, swollen by a gas pressure, the swollen die is coated on the surface with an elastomer solution not containing fillers, heat dried, and the elastic molding die is again turned inside out.

DETAILED DESCRIPTION OF THE INVENTION

Figure 1:
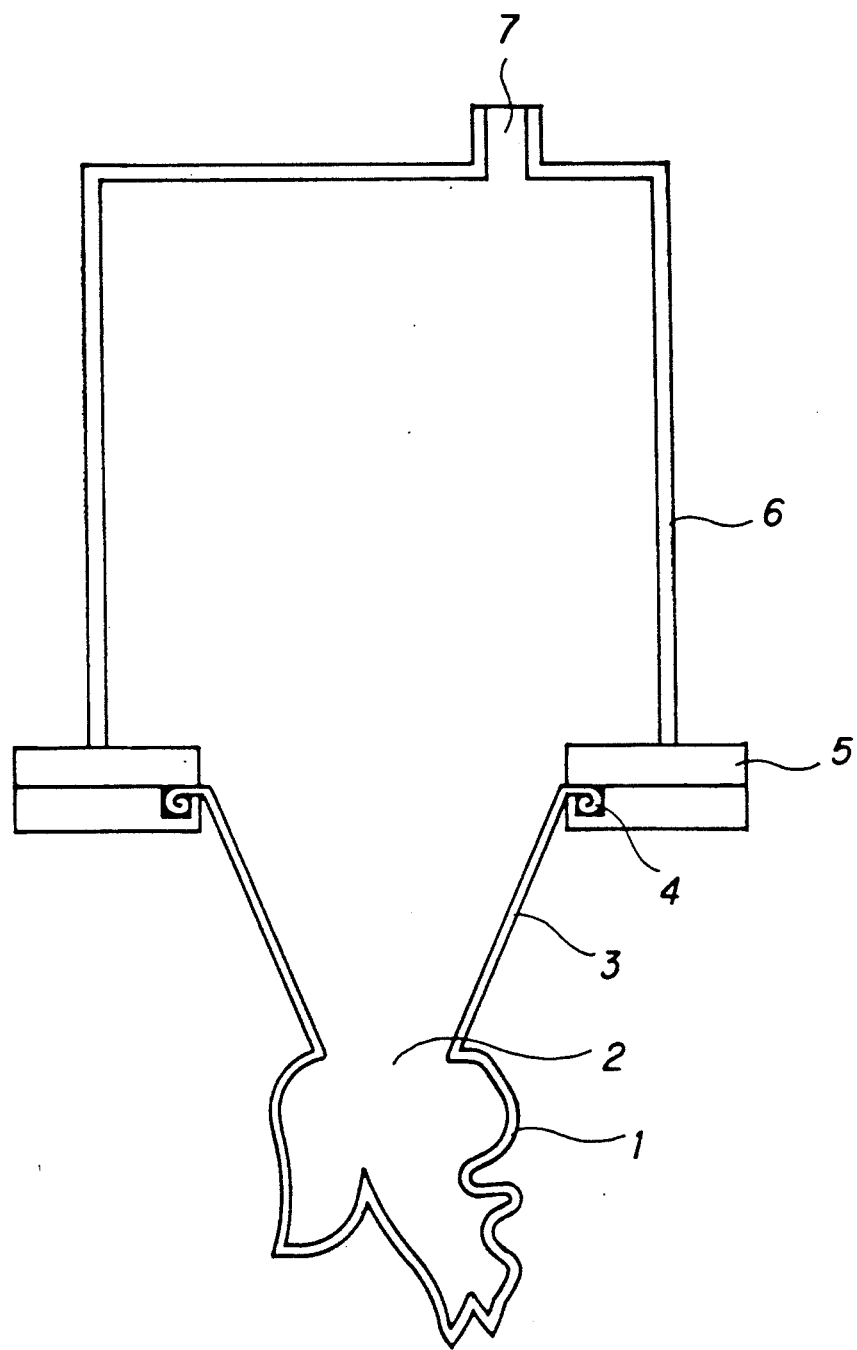
FIG. 1 is a cross sectional view of an embodiment of the elastic molding die according to the invention shown in an inflated, inverted state prior to being coated with an elastomer not containing filler, and gripped in a frame having a vent hole.

This method will now be described in detail. The elastic molding die is formed using a master model. The master model is made of glass, ceramics or the like, and formed to a desired shape such as dolls, animals, flowers and the like. The master model is first dipped in a coagulant solution to coat the surface with a coagulant. The result is dipped in an elastomer solution, and taken out. This forms a thick, gelled elastomer film on the surface of the master model. The elastomer solution may be with or without fillers. The resulting master model is washed with water, dried, the elastomer film is peeled from the master model, and vulcanized, thus obtaining a hollow elastic molding die having an opening. The elastomer solution and the coagulant solution can be those described above.

Since the inner wall surface of the above elastic molding die is rough, which cannot produce moldings of smooth surface and good luster, in the present invention, a smooth coating film is formed on the inner wall surface of the elastic molding die. This treatment will now be described.

The above elastic molding die is turned inside out so that the inner wall surface is exposed. A gas such as air is pressed into the elastic molding die through its opening to swell out the die. An example of the gas injection and subsequent treatment will now be described with reference to the drawing. In FIG. 1, numeral 1 indicates an elastic molding die for producing a complex-shaped molding having irregularities, the drawing showing the reversed state. Numeral 2 indicates an opening of the elastic molding die. Numeral 3 indicates a conical support extending outward from the opening, numeral 4 indicates a grip provided at an end of the conical support, and numeral 5 indicates a frame, to which the grip 4 is mounted. Therefore, the elastic molding die 1 is hung down on the frame 5 through the support 3. In this state, the frame 5 is covered on top with a cup 6 which is provided with a vent hole 7. FIG. 1 is a cross sectional view showing the above-described elastic molding die. Air is pumped in through the vent hole 7 to pressurize the cup, and the elastic molding die 1 is swollen by the pressure.

The swollen elastic molding die 1 is dipped in an elastomer solution not containing fillers to coat the surface with the elastomer solution. Since the elastic molding die is swollen, fine recesses on the elastic molding die are extended to cause the elastomer solution to come into fine recesses, which cannot be treated by conventional methods, thereby uniformly coating the entire surface of the elastic molding die. The elastic molding die is then taken out and dried in the swollen state. The vent hole 7 is then opened to revert the elastic molding die back to the original state, and heated again to set the elastomer solution, forming a coating film.

Then, air in the cup is sucked through the vent hole 7 to reduce pressure in the cup 7. By the evacuation, the elastic molding die 1 is put in the cup in the reversed state (that is, the coated surface comes inside). The cup is removed to take out the elastic molding die 1 from the frame 5 to obtain an elastic molding die with a smooth elastomer coating film not containing fillers uniformly formed on the inner wall surface. In addition to the dipping, application of the elastomer solution can alternatively be achieved by spraying or the like. The elastic molding die after forming the coating film may be turned inside out manually.

The elastomer solution to be coated comprises natural rubber latex, chloroprene rubber latex, urethane rubber latex, silicone rubber latex or the like, which is not mixed with fillers such as clay in order to obtain a smooth coating film. When forming molding materials containing large amounts of fatty ingredients such as chocolate, the inner wall tends to be swollen and deformed during repeated use of the elastic molding die, making it difficult to obtain moldings with a desired luster, and it is preferable that the coating film is formed of an oil-resistant elastomer such as acrylic resins, urethane resins, fluororesins or the like.

DESCRIPTION OF THE PREFERRED EMBODIMENTS

The present invention will now be described in further detail with reference to the embodiments.

EXAMPLE 1

The following materials were mixed to form the inner layer and the outer layer of the elastic molding die.

| Composition for inner layer formation | |
|---|---|
| Chloroprene rubber latex (as solid) | 100 parts by wt. |
| Zinc oxide | 5 |
| Dithiocarbamate-based vulcanization promotor | 1 |
| Thiuram-based vulcanization promotor | 1 |
| Sulfur | 1 |
| Aging prevention agent | 1 |
| Stabilizer | varied |
| Glycine (20%) | varied |

| Composition for outer layer formation | |
|---|---|
| Chloroprene rubber latex (as solid) | 100 parts by wt. |
| Zinc oxide | 5 |
| Dithiocarbamate-based vulcanization promotor | 1 |
| Thiuram-based vulcanization promotor | 1 |
| Sulfur | 1 |
| Aging prevention agent | 1 |
| Stabilizer | varied |
| Carbon black | 30 |
| Glycine (20%) | varied |

An elastic molding die having an inner layer and an outer layer was formed using the above individual latices. A glass-based master model was dipped in a 20% calcium nitrate solution and dried. The master model was dipped in the latex for inner layer formation and dried. The result was again dipped in the 20% calcium nitrate solution and dried, followed by dipping in the latex for outer layer formation and drying. The thus formed stack of elastomer layers was peeled from the master model, treated with 1% ammonia water to remove the coagulant, dried, and heat vulcanized to obtain an elastic molding die.

EXAMPLE 2

The following materials were mixed to prepare a latex for the formation of an outer layer of an elastic molding die.

| Natural rubber latex (as solid) | 100 parts by wt. |
|---|---|
| Sulfur | 1 |
| Zinc oxide | 5 |
| Dithiocarbamate-based vulcanization promotor | 0.4 |
| Thiuram-based vulcanization promotor | 0.4 |
| Aging prevention agent | 1 |
| Clay | 25 |
| Stabilizer | varied |

A ceramic-based master model was first dipped in a 20% calcium nitrate solution and then in the above-prepared latex for 2 to 10 minutes, taken out, and dried at 90° C. for 30 minutes. The solidified latex was peeled from the master model, treated with 1% ammonia water, and then dried at 90° C. for 60 minutes, thus forming an outer layer of an elastic molding die.

The following materials were formulated to prepare dispersions of various oil-resistant resins for the formation of an inner layer of an elastic molding die.

(1) Acrylic rubber dispersion

| | |
|---|---|
| Acrylic Rubber (LX-851, of Nippon Zeon) | 100 parts by wt. |
| Water | 100 |
| Surfactant (polyoxyethylene-alkylphenylether) | 0.1 |
| Thickener (methylcellulose) | varied |

(2) Urethane rubber dispersion

| | |
|---|---|
| Urethane rubber (SuperFlex E-2000, of Dai-ichi Kogyo Seiyaku) | 100 parts by wt. |
| Water | 100 |
| Surfactant (polyoxyethylene-alkylphenylether) | 0.1 |
| Thickener (sodium polyacrylate) | varied |

(3) Fluorinated rubber dispersion

| | |
|---|---|
| Fluorinated rubber latex (GL-152 A, of Daikin Industries) | 100 |
| Fluorinated rubber hardener (GL-152 B, of Daikin Industries) | 5 |

The above dispersions (1), (2), and (3) were individually coated on the inside of the outer layer of the above natural rubber-based elastic molding die to form an inner layer of the elastic molding die. Coating was performed by spraying. Drying was carried out at a temperature and for a length of time sufficient for the individual dispersions to form a strong film. Specifically, the acrylic rubber was dried at 90° C. for 1 to 2 hours, the urethane rubber was dried at 90° C. for 1 to 2 hours, and the fluorinated rubber was dried at 50° to 70° C. for 10 to 20 minutes, and then at 150° C. for 20 to 40 minutes according to the heat resistance of the base rubber.

The natural rubber-based elastic molding die, and the above-obtained individual elastic molding dies which have a natural rubber-based outer layer, and have inner layers of acrylic rubber, urethane rubber, and fluorinated rubber, are filled with chocolate, allowed to stand at 40° C. for 24hours and checked for various properties. The results are shown in Table 1.

TABLE 1

| Outer layer | Natural rubber | Natural rubber | Natural rubber | Natural rubber |
|---|---|---|---|---|
| Inner layer | Natural rubber | Acrylic rubber | Urethane rubber | Fluorinated rubber |
| Swelling (%) | 400 | 7 | 5 | 2 |
| Elongation (%) | 850 | 827 | 825 | 828 |
| Tensile strength (kg/cm²) | 300 | 310 | 315 | 310 |

EXAMPLE 3

| | |
|---|---|
| Chloroprene rubber latex (as solid) | 100 parts by wt. |
| Zinc oxide | 5 |
| Dithiocarbamate-based vulcanization promotor | 1 |
| Thiuram-based vulcanization promotor | 1 |
| Aging prevention agent | 2 |
| Clay | 10 |
| Stabilizer | varied |
| Glycine (20%) | varied |

A ceramic-based master model was first dipped in a 50% calcium nitrate solution and then in the above-prepared latex for 2 to 10 minutes, taken out, and dried at 90° C. for 30 minutes. The solidified latex was peeled from the master model, treated with 1% ammonia water, and then dried at 90° C. for 60 minutes, thus forming an outer layer of an elastic molding die.

The following materials were formulated to prepare an oil repellent agent-containing, oil-resistant rubber dispersion for use in the formation of an inner layer of an elastic molding die. This dispersion was coated on the inner surface of the outer layer using the same procedure as in Example 2 to form an innermost layer.

| | |
|---|---|
| Polyester-polyurethane emulsion (as solid) | 100 parts by wt. |
| Water-soluble melamine-based cross-linking agent | 3 |
| Organic amine salt-based cross-linking agent | 0.3 |
| Fluorine-containing surfactant | 0.2 |
| Methylhydrogen-polysiloxane emulsion | 6 |

In this dispersion, the water-soluble melamine-based and organic amine salt-based cross-linking agents serve to even further enhance the cross-linking degree of the polyester-polyurethane. The fluorine-containing surfactant improves the wettability and has defoaming and foaming suppression functions to aqueous foam.

The same effect was obtained when polytetrafluoroethylene emulsion was used in place of the methylhydrogenpolysiloxane emulsion.

EXAMPLE 4

A ceramic-based master model was dipped in a latex of the following composition for inner layer formation to form an inner layer of an elastic molding die.

| | |
|---|---|
| Chloroprene rubber latex (as solid) | 100 parts by wt. |
| Zinc oxide | 5 |
| Dithiocarbamate-based vulcanization promotor | 1 |
| Thiuram-based vulcanization promotor | 1 |
| Sulfur | 1 |
| Aging prevention agent | 1 |
| Stabilizer | varied |
| Glycine (20%) | varied |

Then, on top of the inner layer formed on the master model, an acrylic rubber dispersion of the following composition was spray coated and dried to form an oil blocking layer.

| | |
|---|---|
| Acrylic rubber (LX-851, of Nippon Zeon) | 100 parts by wt. |
| Water | 100 |
| Surfactant (polyoxyethylene-alkylphenylether) | 0.1 |
| Thickener (methylcellulose) | varied |

After that, the master model was dipped in a latex for outer layer formation of the following composition and dried to form an outer layer of an elastic molding die.

| Chloroprene rubber latex (as solid) | 100 parts by wt. |
|---|---|
| Zinc oxide | 5 |
| Dithiocarbamate-based vulcanization promotor | 1 |
| Thiuram-based vulcanization promotor | 1 |
| Sulfur | 1 |
| Aging prevention agent | 1 |
| Stabilizer | varied |
| Carbon black | 50 |
| Glycine (20%) | varied |

The thus formed elastomer laminate film was peeled from the master model, treated with 1% ammonia water to remove the coagulant, dried, and then heat vulcanized to obtain an elastic molding die.

EXAMPLE 5

A ceramic-based master mold having a smooth surface was dipped in a rubber latex of the following composition, taken out, and dried at 70° C. for 2 minutes to achieve gelation of the rubber latex.

| Chloroprene rubber latex (as solid) | 100 parts by wt. |
|---|---|
| Zinc oxide | 5 |
| Dithiocarbamate-based vulcanization promotor | 1 |
| Thiuram-based vulcanization promotor | 1 |
| Aging prevention agent | 1 |
| Stabilizer | varied |
| Glycine (20%) | varied |
| Pigment | varied |

Then, the master model formed with the gelled rubber latex film was dipped in a 40% methanol solution of calcium nitrate (coagulant), and dried at 90° C. for 5 minutes.

After that, the master model formed with the coagulated rubber latex film was dipped in a rubber latex of the following composition for 2 to 10 minutes and taken out.

| Chloroprene rubber latex (as solid) | 100 parts by wt |
|---|---|
| Sulfur | 1 |
| Zinc oxide | 5 |
| Dithiocarbamate-based vulcanization promotor | 1 |
| Thiuram-based vulcanization promotor | 1 |
| Hard top clay | 20 |
| Aging prevention agent | 1 |
| Pigment | varied |
| Stabilizer | varied |
| Glycine (20%) | varied |

The result was immediately dipped in a 20% methanol solution of calcium nitrate (coagulant), washed with water, and then dried at 90° C. for 60 minutes.

Thus, a rubber film of a uniform thickness was formed on the master model. The thus formed rubber film was peeled from the master model, extraction treated with 1% ammonia water for 15 hours, dried at 90° C. for 5 hours, and heat vulcanized at 140° C. for 90 minutes to obtain an elastic molding die. This elastic molding die had a very smooth inner surface.

EXAMPLE 6

A ceramic-based, squirrel-shaped master model having a smooth surface was dipped in a 40% methanol solution of calcium nitrate (coagulant), and dried at 90° C. for 5 minutes. The master model was then dipped in a rubber latex of the following composition for 2 to 10 minutes and taken out.

| Chloroprene rubber latex (as solid) | 100 parts by wt. |
|---|---|
| Sulfur | 1 |
| Zinc oxide | 5 |
| Dithiocarbamate-based vulcanization promotor | 1 |
| Thiuram-based vulcanization promotor | 1 |
| Hard top clay | 20 |
| Aging prevention agent | 1 |
| Pigment | varied |
| Stabilizer | varied |
| Glycine (20%) | varied |

The resulting master model was immediately dipped in a 20% methanol solution of calcium nitrate (coagulant), washed with water, and then dried at 90° C. for 60 minutes. The thus formed rubber film was peeled from the master model, extraction treated with 1% ammonia water for 15 hours, dried at 90° C. for 5 hours, and heat vulcanized at 140° C. for 90 minutes to obtain an elastic molding die.

The elastic molding die was reversed inside out, and swollen using an apparatus shown in FIG. 1, the swollen die was dipped in a rubber latex of the following composition, and taken out.

| Chloroprene rubber latex (as solid) | 100 parts by wt. |
|---|---|
| Zinc oxide | 5 |
| Dithiocarbamate-based vulcanization promotor | 1 |
| Thiuram-based vulcanization promotor | 1 |
| Aging prevention agent | 1 |
| Stabilizer | varied |
| Glycine (20%) | varied |
| Pigment | varied |

Since the elastic molding die is swollen, the rubber latex can come into fine recesses of the elastic molding die, achieving uniform coating. The swollen elastic molding die was predried at 90° C. for 5 minutes. The elastic molding die was then deflated, and heat vulcanized at 140° C. for 90 minutes. Using the method described above with reference to FIG. 1, the elastic molding die was again reversed inside out. Thus, an elastic molding die having a smooth and uniform rubber coating film on the inner wall surface was obtained. When this elastic molding die was used for molding chocolate, chocolate moldings having a uniform luster were obtained.

EXAMPLE 7

Latices of the following compositions (1), (2), and (3) were used as elastic material solutions to form the inner surface of an elastic molding die. The individual latices were coated on the inner wall surface of the elastic molding die of Example 6 using the same procedure as in Example 6.

| (1) Acrylic rubber dispersion | |
|---|---|
| Acrylic Rubber (LX-851, of Nippon Zeon) | 100 parts by wt. |
| Water | 100 |
| Surfactant (polyoxyethylene-alkylphenylether) | 0.1 |

-continued

(1) Acrylic rubber dispersion

| | |
|---|---|
| Thickener (methylcellulose) | varied |

(2) Urethane rubber dispersion

| | |
|---|---|
| Urethane rubber (SuperFlex E-2000, of Dai-ichi Kogyo Seiyaku) | 100 parts by wt. |
| Water | 100 |
| Surfactant (polyoxyethylene-alkylphenylether) | 0.1 |
| Thickener (sodium polyacrylate) | varied |

(3) Fluorinated rubber dispersion

| | |
|---|---|
| Fluorinated rubber latex (GL-152 A, of Daikin Industries) | 100 |
| Fluorinated rubber hardener (GL-152 B, of Daikin Industries) | 5 |

Drying was carried out at a temperature and for a length of time sufficient for the individual dispersions to form a strong film. Specifically, the acrylic rubber was dried at 90° C. for 1 to 2 hours, the urethane rubber was dried at 90° C. for 1 to 2 hours, and the fluorinated rubber was dried at 50° to 70° C. minutes, and then at 150° C. for 20 to 40 minutes according to the heat resistance of the base rubber. After that, the elastic molding die was again turned inside out. Thus, elastic molding dies having a smooth, uniform, oil-resistant coating film on the inner wall surface were obtained. When each of these elastic molding dies was used for molding chocolate, chocolate moldings having a uniform luster were obtained.

The elastic molding die according to the present invention can produce moldings having a good surface luster since the innermost layer is formed of a filler-free elastomer. Furthermore, an oil-resistant elastomer can be used in the innermost layer to produce moldings of good surface luster for an extended period of time, as well as preventing the elastic molding die from swelling with oil ingredients contained in the molding materials. An oil-repellent agent such as silicone resins can be used in the innermost elastomer layer to produce moldings of good surface luster over an even longer period of time. In the elastic molding die according to the present invention, the outer layer can be formed of an elastomer containing fillers to improve the strength and durability. Furthermore, an oil-resistant elastomer can be used between the innermost layer and the outer layer to prevent the elastic molding die from swelling and deforming due to absorption of oil ingredients contained in the molding materials.

With the method according to the present invention, an elastic molding die having a smooth surface and a thickness sufficient for use as an elastic molding die can be easily produced since the inner surface of the molding die is not affected by a coagulant. With the other method according to the present invention, since the elastic molding die can be turned inside out, swollen by pressing in a gas, and then coated with an elastic material, the elastic material can penetrate fine recesses of patterns of even complex-patterned elastic molding dies, or even when elastic material is highly viscous, forming a smooth and uniform coating film. The coated elastic molding die can again be turned inside out to obtain an elastic molding die having a smooth and uniform coating film on the inner wall surface. These elastic molding dies, since the inner wall surface is smooth, can produce moldings such as chocolate moldings with a good surface luster.

What is claimed is:

1. An expandable elastic molding die comprising an elastomer laminate film in the shape of a female mold, having an outer layer comprising elastomer and filler and an innermost layer comprising an elastomer not containing fillers.

2. The elastic molding die of claim 1 wherein said innermost layer elastomer is an oil-resistant elastomer.

3. The elastic molding die of claim 1 or claim 2 wherein said innermost layer elastomer contains an oil-repellent agent selected from any one of the group consisting of silicone resins and fluororesins.

4. The elastic molding die of claim 3 further comprising an oil blocking layer provided between the innermost layer and the outer layer.

5. The elastic molding die of claim 3 wherein said oil-repellant agent is present in an amount of from 2 to 10 parts by weight per 100 parts by weight of the innermost layer elastomer.

6. The elastic molding die of claim 1 or 2 further comprising an oil blocking layer provided between the innermost layer and the outer layer.

7. The elastic molding die of claim 6 wherein the oil blocking layer comprises a rubber selected from any one of the group consisting of a nitrile-butadiene rubber, acrylic rubber, urethane rubber, and fluorinated rubber.

* * * * *